US012469410B2

(12) United States Patent
Hsiao-Wecksler et al.

(10) Patent No.: US 12,469,410 B2
(45) Date of Patent: Nov. 11, 2025

(54) TRAINING SIMULATOR FOR HEALTHCARE TRAINING

(71) Applicant: The Board of Trustees of the University of Illinois, Urbana, IL (US)

(72) Inventors: Elizabeth T. Hsiao-Wecksler, Urbana, IL (US); Yinan Pei, Urbana, IL (US); Kevin Gim, Savoy, IL (US); Prateek Garag, Cupertino, CA (US); Evan Ripperger, Urbana, IL (US); Christopher M. Zallek, Peoria Heights, IL (US)

(73) Assignees: THE BOARD OF TRUSTEES OF THE UNIVERSITY OF ILLINOIS, Urbana, IL (US); OSF HEALTHCARE SYSTEM, Peoria, IL (US)

( * ) Notice: Subject to any disclaimer, the term of this patent is extended or adjusted under 35 U.S.C. 154(b) by 755 days.

(21) Appl. No.: 17/817,875

(22) Filed: Aug. 5, 2022

(65) Prior Publication Data
US 2023/0057349 A1 Feb. 23, 2023

Related U.S. Application Data

(60) Provisional application No. 63/229,723, filed on Aug. 5, 2021.

(51) Int. Cl.
*G09B 23/32* (2006.01)
(52) U.S. Cl.
CPC .................................. *G09B 23/32* (2013.01)
(58) Field of Classification Search
CPC ........ G09B 23/28; G09B 23/30; G09B 23/32; A63H 3/46
See application file for complete search history.

(56) References Cited

U.S. PATENT DOCUMENTS 7,712,640 B2 * 5/2010 Honer .................... G09B 23/28
223/66
8,108,109 B2 1/2012 Riener et al.
(Continued)

FOREIGN PATENT DOCUMENTS

JP 6166400 B1 * 7/2017 ................ A63H 3/46
WO WO-2009135956 A1 * 11/2009 ............. G09B 23/32

OTHER PUBLICATIONS

A. D. Pandyan, G. R. Johnson, C. I. M. Price, R. H. Curless, M. P. Barnes, and H. Rodgers, "A review of the properties and limitations of the Ashworth and modified Ashworth Scales as measures of spasticity," Clin. Rehabil., vol. 13, No. 5, pp. 373-383, Oct. 1999, doi: 10.1191/026921599677595404.
(Continued)

*Primary Examiner* — Kurt Fernstrom
(74) *Attorney, Agent, or Firm* — Crowell & Moring LLP

(57) ABSTRACT

A training simulator for healthcare provider training may include one or more of the following: a first body component; a second body component; and a joint located at a junction of the first body component and the second body component, where the first body component is rotatable relative to the second body component at the joint. An actuator system for the training simulator may include a linear slider-crank mechanism and an actuator for controlling the linear slider-crank mechanism, where the linear slider-crank mechanism is configured to control a torque required to move the first body component relative to the second body component at the joint, and where control of the linear slider-crank mechanism with the actuator adjusts the torque.

20 Claims, 11 Drawing Sheets

(56) References Cited

U.S. PATENT DOCUMENTS

| | | | |
|---|---|---|---|
| 9,498,401 B2 | 11/2016 | Herr et al. | |
| 2011/0034104 A1* | 2/2011 | Cao | A63H 3/40 |
| | | | 446/343 |
| 2012/0123592 A1* | 5/2012 | Carignan | A61F 2/70 |
| | | | 700/275 |
| 2023/0404672 A1* | 12/2023 | Bode | A61B 34/10 |

OTHER PUBLICATIONS

C. Gordon et al., "Anthropometric Survey of U.S. Army Personnel: Summary Statistics, Interim Report for 1988," Jan. 1989.

C. Wang et al., "Development an arm robot to simulate the lead-pipe rigidity for medical education," in 2015 IEEE International Conference on Information and Automation, ICIA 2015—In conjunction with 2015 IEEE International Conference on Automation and Logistics, Aug. 2015, pp. 619-624, doi: 10.1109/ICInfA.2015.7279361.

C. Wang et al., "Development of an arm robot for neurologic examination training," in IEEE International Conference on Intelligent Robots and Systems, Oct. 2012, pp. 1090-1095, doi: 10.1109/IROS.2012.6385801.

D. I. Grow, Mengnan Wu, M. J. Locastro, S. K. Arora, A. J. Bastian, and A. M. Okamura, "Haptic Simulation of Elbow Joint Spasticity," in 2008 Symposium on Haptic Interfaces for Virtual Environment and Teleoperator Systems, Reno, NE, Mar. 2008, pp. 475-476, doi: 10.1109/HAPTICS.2008.4479997.

E. Pennestri, V. Rossi, P. Salvini, and P. P. Valentini, "Review and comparison of dry friction force models," Nonlinear Dyn., vol. 83, Mar. 2016, doi: 10.1007/s11071-015-2485-3.

G. A. Pratt and M. M. Williamson, "Series elastic actuators," in 1995 IEEE/RSJ International Conference on Intelligent Robots and Systems. "Human Robot Interaction and Cooperative Robots," 1995, vol. 1, pp. 399-406, doi: 10.1109/IROS.1995.525827.

Hyung-Soon Park, Jonghyun Kim, and D. L. Damiano, "Development of a Haptic Elbow Spasticity Simulator (HESS) for Improving Accuracy and Reliability of Clinical Assessment of Spasticity," IEEE Trans. Neural Syst. Rehabil. Eng., vol. 20, No. 3, pp. 361-370, May 2012, doi: 10.1109/TNSRE.2012.2195330.

J. Liang, Y. Pei, R. H. Ewoldt, S. R. Tippett, and E. T. Hsiao-Wecksler, "Passive Hydraulic Training Simulator for Upper Arm Spasticity," J. Mech. Robot., vol. 12, No. 4, Aug. 2020, doi: 10.1115/1.4045845.

J. Pratt, B. Krupp, and C. Morse, "Series elastic actuators for high fidelity force control," Ind. Robot Int. J., vol. 29, No. 3, pp. 234-241, 2002, doi: 10.1108/01439910210425522.

K. G. Gim et al., "Development of a Series Elastic Elbow Neurological Exam Training Simulator for Lead-pipe Rigidity," *2021 IEEE International Conference on Robotics and Automation (ICRA)*, Xi'an, China, May 2021, pp. 10340-10346, doi: 10.1109/ICRA48506.2021.9560891.

N. A. Cz, T. Komeda, and C. Y. Low, "Design of Upper Limb Patient Simulator," Procedia Eng., vol. 41, pp. 1374-1378, 2012, doi: 10.1016/j.proeng.2012.07.324.

Okumura, Hiroshi & Okamoto, Shogo & Ishikawa, Shun & Isogai, Kaoru & Yamada, Naomi & Akiyama, Yasuhiro & Yamada, Yoji. (2014). Exoskeleton simulator for an impaired ankle: Simulation of spasticity and clonus. 10.1007/978-4-431-55690-9_40.

Pei, Yinan, et al., Modeling, Control, and Clinical Validation of an Upper-Limb Medical Education Task Trainer for Elbow Spasticity and Rigidity Assessment, 2023, pp. 3320-3330, IEEE Transactions on Neural Systems and Rehabilitation Engineering, vol. 31.

Prateek Garag, "Mechatronic and Biomechanical Considerations Toward The Design of an Ankle Clonus Simulator," UIUC Masters Thesis, Dec. 13, 2019, (accessed at https://www.ideals.illinois.edu/items/113946).

S. K. Patrick, A. A. Denington, M. J. A. Gauthier, D. M. Gillard, and A. Prochazka, "Quantification of the UPDRS rigidity scale," IEEE Trans. Neural Syst. Rehabil. Eng., vol. 9, No. 1, pp. 31-41, Mar. 2001, doi: 10.1109/7333.918274.

S. Y. Song, "Quantification of Spasticity and Rigidity for Biceps and Triceps using the PVRM (Position, Velocity, and Resistance Meter)," MS Thesis, Mechanical Engineering, University of Illinois at Urbana-Champaign, 2019.

S. Y. Song, Y. Pei, J. Liang, and E. T. Hsiao-Wecksler, "Design of a Portable Position, Velocity, and Resistance Meter (PVRM) for Convenient Clinical Evaluation of Spasticity or Rigidity," in 2017 Design of Medical De-vices Conference, Minneapolis, Minnesota, USA, Apr. 2017, p. V001T11A020, doi: 10.1115/DMD2017-3503.

T. D. Sanger, M. R. Delgado, D. Gaebler-Spira, M. Hal-lett, J. W. Mink, and Task Force on Childhood Motor Disorders, "Classification and definition of disorders causing hypertonia in childhood," Pediatrics, vol. 111, No. 1, pp. e89-e97, Jan. 2003, doi: 10.1542/peds.111.1.e89.

Takehito Kikuchi , Kunihiko Oda & Junji Furusho (2010) Leg-Robot for Demonstration of Spastic Movements of Brain-Injured Patients with Compact Magnetorheological Fluid Clutch, Advanced Robotics, 24:5-6, 671-686, DOI: 10.1163/016918610X493534.

W. J. Mutch, A. Strudwick, S. K. Roy, and A. W. Downie, "Parkinson's disease: disability, review, and management.," Br. Med. J. Clin. Res. Ed, vol. 293, No. 6548, pp. 675-677, Sep. 1986.

Y. Pei, R. H. Ewoldt, C. M. Zallek, and E. T. HsiaoWecksler, "Revised Design of a Passive Hydraulic Training Simulator of Biceps Spasticity," presented at the 2018 Design of Medical Devices Conference, Jun. 2018, doi: 10.1115/DMD2018-6881.

Y. Pei, T. Han, C. M. Zallek, T. Liu, L. Yang and E. T. Hsiao-Wecksler, "Design and Clinical Validation of a Robotic Ankle-Foot Simulator With Series Elastic Actuator for Ankle Clonus Assessment Training," in IEEE Robotics and Automation Letters, vol. 6, No. 2, pp. 3793-3800, Apr. 2021, doi: 10.1109/LRA.2021.3065242. Downloaded from the Internet at https://ieeexplore.ieee.org/document/9376603, Feb. 28, 2024.

* cited by examiner

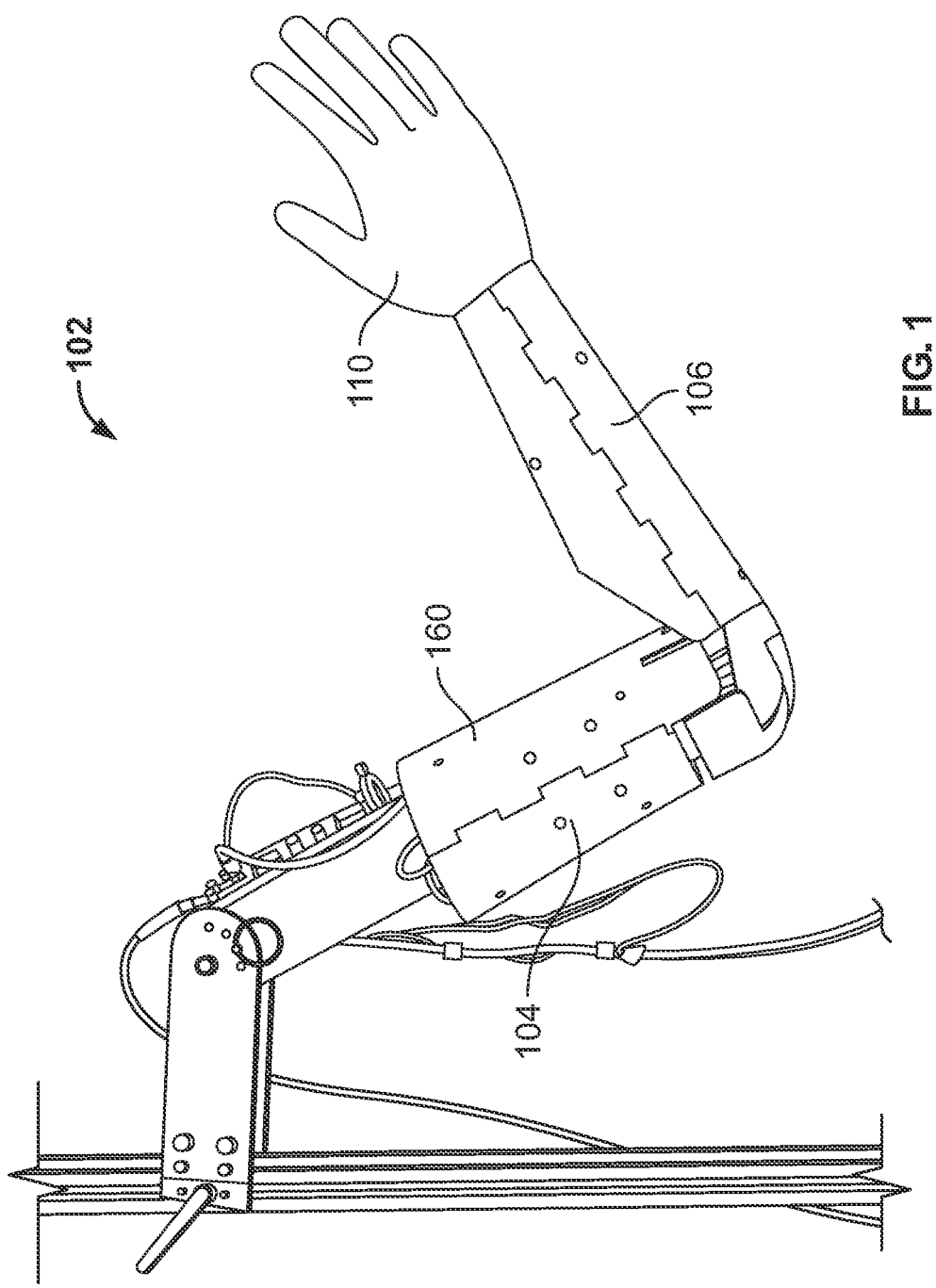

TRAINING SIMULATOR FOR HEALTHCARE TRAINING

RELATED APPLICATION(S)

This application claims the benefit of U.S. Provisional Application No. 63/229,723, filed Aug. 5, 2021, which is hereby incorporated by reference in its entirety.

BACKGROUND

During neurological examinations, clinicians need to perform manual assessment techniques (e.g., passive stretching of affected muscles, tapping the tendon) to elicit clinical signs to diagnose neurological conditions and rely on haptic experiential knowledge to evaluate muscle tone. Although more advanced non-invasive assessment techniques are emerging, manual physical assessment is still standard in the clinical setting. Therefore, it is imperative to afford new clinicians, residents, and students more exposure to the haptic feeling of common abnormal behaviors during training and to practice their ability to trigger clinical manifestations of neurological conditions and distinguish the severity of the condition. Traditional clinical training of motor skill assessment is carried out on live subjects. Instructors usually bring in a small number of practice patients into the classroom or let students pretend to be the patient for each other, which leads to limited practice opportunities and inconsistent training outcomes. Two conditions detectable by evaluating motor skills/symptoms are lead-pipe rigidity and ankle clonus.

Lead-Pipe Rigidity

Lead-pipe rigidity is one of the one of primary motor symptoms observed in patients with Parkinson's disease, and manifests as abnormal muscle tone. This muscle tone resistance is independent of stretch speed and encountered uniformly (lead-pipe rigidity) or with tremor (cogwheel rigidity) throughout the range of motion as a joint is stretched.

During a neurological examination, clinical evaluation is done by passively moving upper and lower limb joints. Abnormalities in muscle tone, range of motion, and symmetry are noted as the joint is flexed or extended at various speeds. The Unified Parkinson's Disease Rating Scale (UP-DRS) motor examination portion is a widely used clinical assessment tool to classify rigidity severity. This qualitative scale utilizes 5-level ratings of rigidity, with a score of 0 indicating the absence of rigidity and a score of 4 indicating severe rigidity with limited range of motion.

Accurate initial diagnosis of condition and determination of severity level are valuable for subsequent treatment plans and patient health. Due to similarities and subtleties of symptoms, proper diagnosis between conditions, such as rigidity or spasticity, can be difficult especially if the clinician has limited experience observing variations within and between conditions. Spasticity also manifests as increased resistance but with stretch speed-dependence and a unique abrupt increase and gradual decrease in resistance across the range of motion, i.e., catch-release behavior. Iterative practical training on patients with neurological conditions is necessary for medical professional trainees to grasp the subtle differences between conditions and severity levels. It has been shown that with more practical experience, rating variability using these qualitative scales will decrease. However, repeated interaction opportunities are rare in training institutions due to limited practice patient availability. Therefore, robotic training simulators have been explored to provide realistic and consistent practice opportunities for future medical professionals to learn the different muscle tone behaviors without the presence of patients.

Presently, a small number of upper-extremity training simulators have been developed in academic settings to recreate abnormal muscle tone observed in patients with neuromuscular diseases. Most have attempted to replicate spasticity with different actuation mechanisms. These devices have focused on elbow spasticity. For example, one known simulator [add citation] involves an arm robot for neurologic examination training for both spasticity and lead-pipe rigidity, which utilizes a six-axis force sensor and two brushless DC motors to simulate lead-pipe rigidity, cogwheel rigidity, and clasp-knife spasticity behavior. A second known version revised the actuation system with a motor and an electro-magnetic powder brake for simulating active passive symptoms respectively, and implements a control scheme with a motor neuromuscular model to simulate lead-pipe rigidity. Although the performance of the simulator was somewhat successful, the 6-axis force sensor and a harmonic drive are associated with undue cost, which causes an obstacle for deploying the device to actual curriculum for trainees.

Clonus

Clonus is defined as involuntary and rhythmic muscle contractions caused by lesions in the upper motor neuron pathways. Although clonus has been reported in muscle groups at other joints, it is most commonly tested and observed at the ankle joint. Ankle clonus can be elicited during a neurological examination by rapidly dorsiflexing (DF) the ankle and maintaining a stretched state of the ankle plantar-flexor muscles, as a result of sudden peripheral inputs activating the hyperactive stretch reflex. Ankle clonus response is a rhythmic oscillation (or "beating") of the foot against an external load with a characteristic frequency between 5-8 Hz.

A patient is diagnosed with ankle clonus if the clinician is able to induce a "sustained clonus" response, i.e., five or more consecutive beats. Successful triggering of ankle clonus requires mastery of the following technique: (a) correct positioning of the examining hand on the foot (i.e., evenly supporting on the plantar metatarsal area or grasping both lateral and medial aspects of the forefoot); (b) minimize ankle inversion (i.e., the foot should be in neutral or eversion); (c) provide a rapid dorsiflexion to trigger a stretch reflex (>200°/s); and (d) maintain constant applied torque on the dorsal surface of the forefoot (>3 Nm).

The inventors are aware of only two existing devices that attempted to recreate ankle clonus for clinicians to train. One such device includes an electromechanical leg-shaped portion that used a DC direct-drive motor to generate oscillatory ankle motion to mimic clonus behavior. The motor output torque is transmitted to the user through a magnetorheological fluid (MRF) clutch. The device switches to the clonus state based on the user's input stretch speed and sustained interaction torque. This design has several drawbacks: it lacks a physiologically-accurate foot shape and the inversion/eversion degree of freedom (DOF) at ankle joint, it is mechanically complex due to the use of the MRF clutch, and the use of such a clutch introduces unwanted viscous friction torque and as a result the control algorithm had to compute real-time compensation and the device could not command a torque smaller than the viscous torque. Another such exoskeleton device that created clonus-like behavior on healthy individuals was prototyped by Okumura et al. via a geared DC motor and cable-driven mechanism. The device worn by healthy subjects and works by imposing external actuation force on the wearer's ankle joint to simulate the clonus beats for learners to feel and train. However, several limitations are evident to the inventors in this design: the force output was relatively small, i.e., 10-20 N, the force control performance is not reported (so it was unclear if the device operated in open-loop current control or used a force sensor for closed-loop feedback), and the clinical realism of these two devices is not established and only examined by two clinicians with minimal result reporting.

BRIEF DESCRIPTION OF THE DRAWINGS

The embodiments discussed herein may be better understood with reference to the following drawings and description. The components in the figures are not necessarily to scale. Moreover, in the figures, like-referenced numerals designate corresponding parts through the different views and embodiments.

FIG. 1 is an image showing a first embodiment of a training similar, in particular a elbow lead-pipe rigidity simulator for simulating elbow rigidity for medical training purposes in accordance with certain aspects of the present disclosure.

FIG. 8 depicts certain mechanical control elements for simulating muscle movements in accordance with certain aspects of the present disclosure.

DETAILED DESCRIPTION

In view of the background discussed above, an objective of the inventors is to present aspects related to training simulators that can be deployed for safe, cost-effective, and cost-effective medical training.

At a high level, the present application is directed to a training simulator for healthcare provider training, where a first body component and a second body component are coupled via a mechanical joint (e.g., such as two arm components coupled via an elbow, or a foot and leg component coupled via a mechanical ankle). In other words, the joint is located at a junction of the first body component and the second body component, where the first body component is rotatable relative to the second body component at the joint. A key aspect to the training simulator is an actuator system, which may include a series elastic actuator (hereafter referred to as "SEA"). Without limitation, the SEA may include a linear slider-crank mechanism and an actuator for adjusting the linear slider-crank mechanism for varying certain characteristics, thereby simulating varying characteristics of human (or animal) patients. For example, the linear slider-crank mechanism may be configured to control a torque required to move the first body component relative to the second body component at the joint, where adjustment of the linear slider-crank mechanism adjusts the torque required for such movement. These aspects may be relevant to numerous simulation techniques for the purpose of medical training, as well as other purposes.

To better describe certain aspects, two particular embodiments are described herein for purposes of illustration. It shall be appreciated that these embodiments are included as non-limiting examples only, and numerous variations are contemplated.

Embodiment 1: Elbow Lead-Pipe Rigidity Simulator

Figure 2:
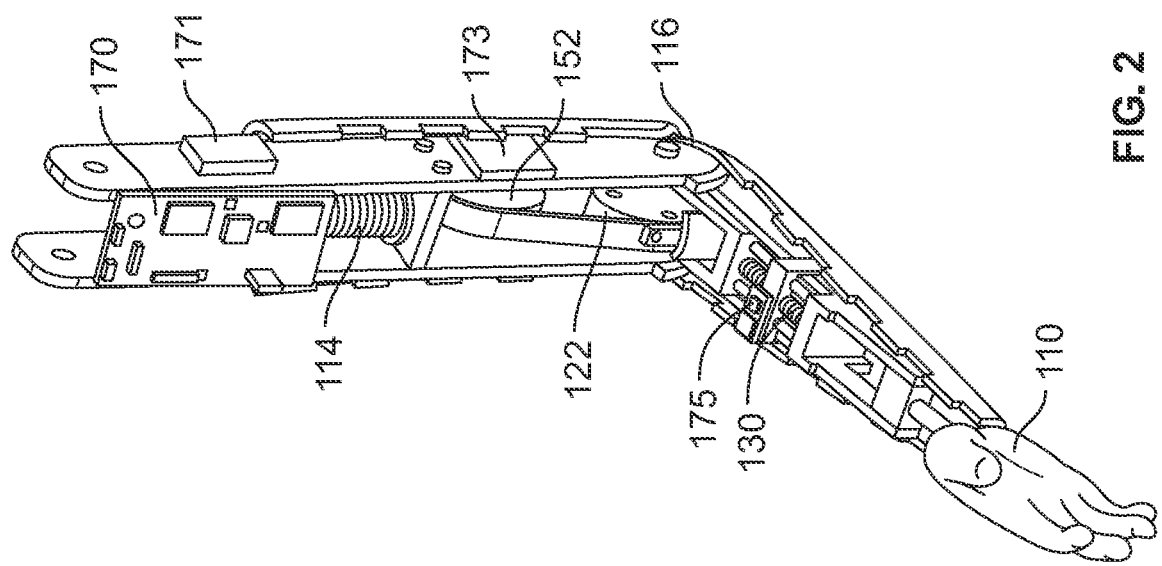
FIG. 2 is an image showing certain internal control components fo the elbow lead-pipe rigidity simulator depicted in FIG. 1.

An elbow rigidity simulator 102 is shown in FIGS. 1-2. In the depicted example, the elbow rigidity simulator is a 1-DOF kinesthetic haptic force display device for replicating resistance from rigidity behavior of various severity levels. A series elastic actuator 104, shown in FIGS. 2-4 and described in more detail below, was introduced to implement a feed-back force control. Generally (and as discussed in more detail below with reference to particular embodiments), an SEA is an elastic component which connects an end-effector and an actuator in serial. By measuring the deflection of the elastic component, the interaction force can be estimated. Thus, feed-back-force control of the interaction force can be achieved by controlling the deflection of the elastic component.

Referring to FIGS. 1-4, the elbow rigidity simulator 102 includes properties of the associated human limb (e.g., an upper arm component 106, a forearm component 108, and a hand component 110). In the illustrated and described embodiment, the dimensions are matched with the anthropometric data of a 50$^{th}$ percentile Caucasian male and thus the following dimensions and other characteristics are included as an illustrating example, although other sizing are also within the scope of the invention.

In the depicted embodiment, the range of motion (ROM) of the simulator is from about 45° (fully flexed) to 165°

Figure 3:
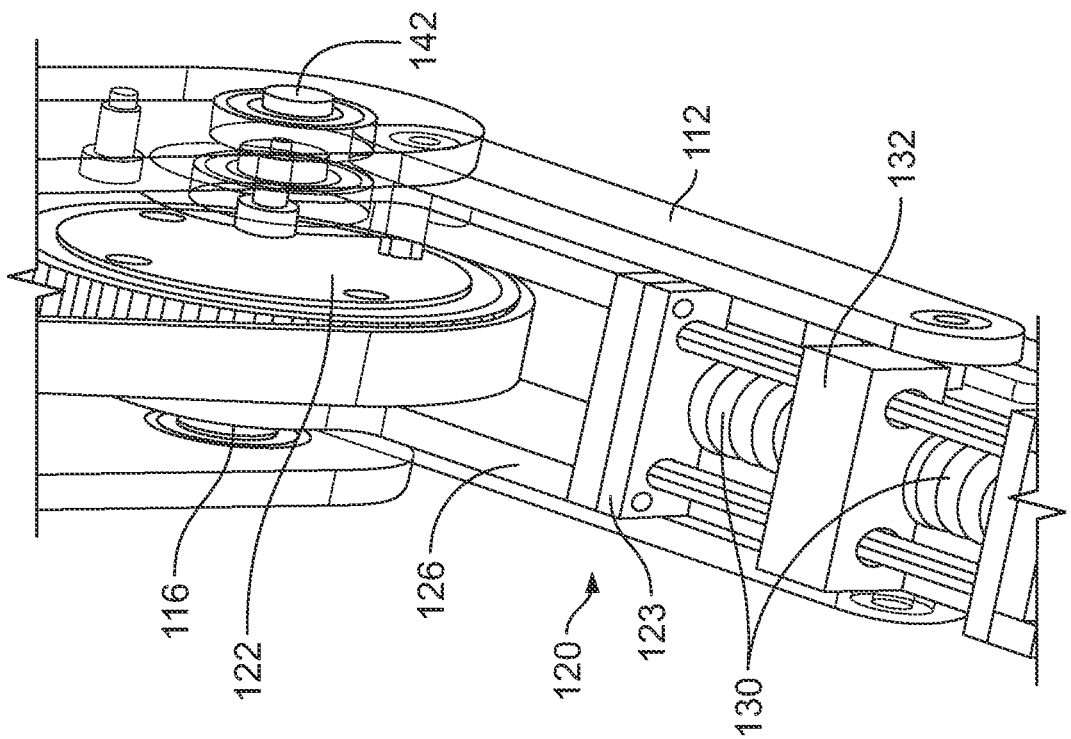
FIG. 3 is an image showing certain control components, such as a series elastic actuator, of the elbow lead-pipe rigidity simulator depicted in FIG. 1.
Figure 4:
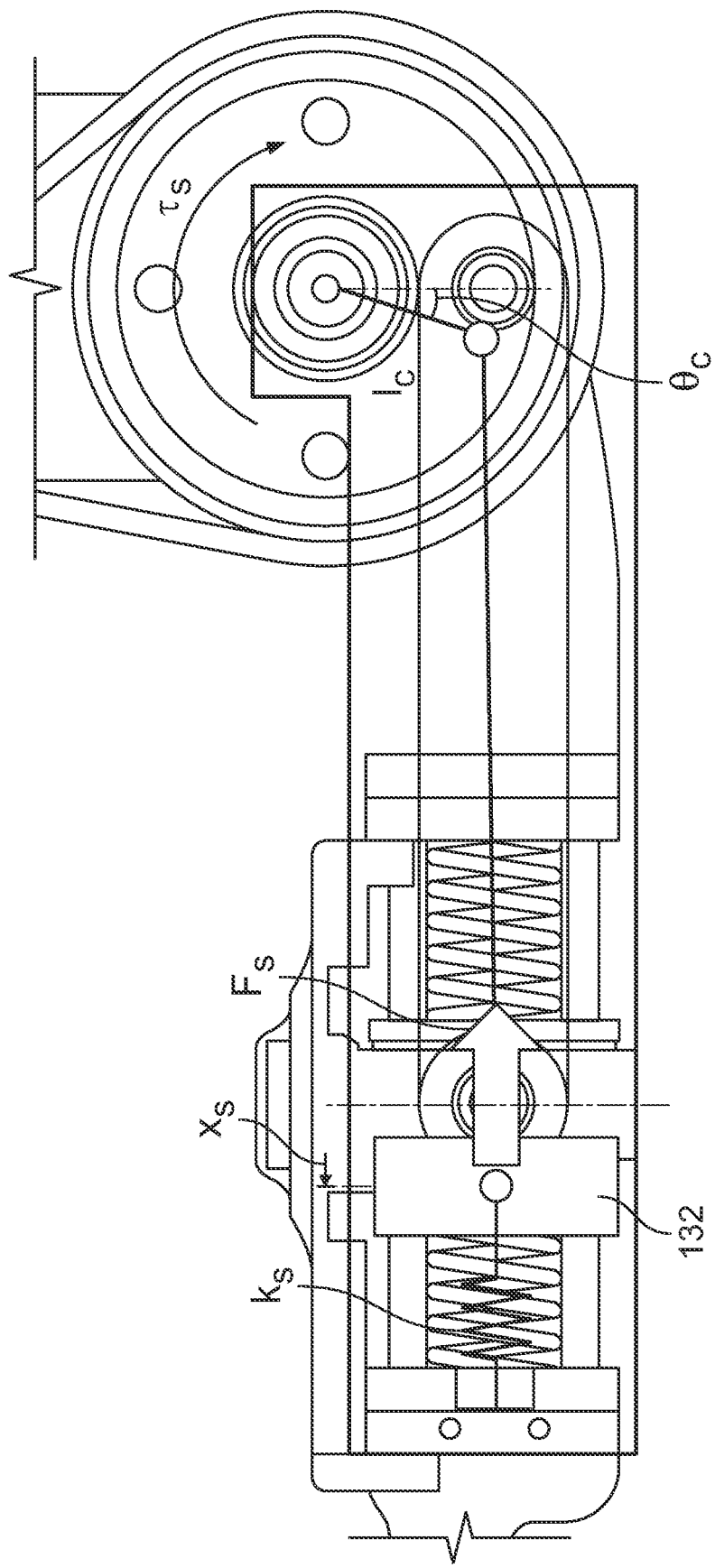
FIG. 4 is a force diagram showing certain aspects of the series elastic actuator shown in FIG. 3 (e.g., subject forces on a slider block and torque about an elbow joint) in accordance with certain aspects of the present disclosure.

(fully extended), although other ranges are also contemplated. In FIGS. 1-3, the device is shown in roughly the fully flexed position. As shown, the actuator system (e.g., SEA) for moving the components between being flexed and extended may generally include a linear slider-crank 112 and an actuator 114 for adjusting the linear slider-crank 112. As discussed in more detail below, the linear slider-crank 112 may generally be configured to control a rigidity between the upper arm component 106 and the forearm component 108 at the elbow joint 116. Adjustment of the linear slider-crank 112 with the actuator 114 may controls the rigidity at the elbow joint 116, as discussed in more detail herein.

A desired actuation capability of the simulator of the depicted embodiment depends on the mean maximum stretch speed and muscle resistive torque measured during passive stretch tests in extension and flexion from adult patients with rigidity at different UPDRS levels (Table 1).

TABLE 1

| | Extension | | | Flexion | | |
|---|---|---|---|---|---|---|
| | $\omega_{max}$ (rad/s) | $\tau_{avg}$ (Nm) | $\tau_{max}$ (Nm) | $\omega_{max}$ (rad/s) | $\tau_{avg}$ (Nm) | $\tau_{max}$ (Nm) |
| UPDRS 0* (n = 15) | 2.88 | 1.0 | 3.1 | 3.28 | 0.8 | 2.9 |
| UPDRS 1 (n = 3) | 2.58 | 6.2 | 9.5 | 2.37 | 2.9 | 6.5 |
| UPDRS 2 (n = 6) | 1.97 | 8.0 | 12.0 | 2.19 | 7.1 | 11.7 |
| UPDRS 3 (n = 2) | 2.04 | 10.3 | 16.2 | 2.72 | 7.6 | 14.4 |

*Subjects with UPDRS level 0 were a healthy control group with no rigidity condition.

During the design phase, these maximum torque and speed values were considered as valuable references for deciding the specifications of mechanical components such as the actuator power and gear ratio of the drivetrain. The training simulator was actuated by a brushless DC motor with an integrated two-stage planetary gearbox (~19:1) (M3508, DJI, China), which offered 150 W of continuous power with 5 Nm of maximum torque. The motor rotation was transmitted to the elbow joint through a 2:1 bevel gear set followed by a 2.67:1 timing belt drive (MR5, Misumi, Japan). This transmission design allowed for a maximum resistive torque of 26 Nm at the elbow joint, which can sufficiently cover the required joint torque for these four UPDRS levels (Table 1).

The drivetrain of the training simulator, generally including the series elastic actuator 104, was designed to replicate the rigidity resistance in a variety of patients. For example, the training simulator needed to display variable joint torques at the elbow while interacting with a user. As discovered by the inventors, and in contrast to other force-control mechanisms contemplated, the utilization fo the series elastic actuator 104 is advantageous due to its superior safety, cost-effectiveness, and good force control accuracy.

FIG. 3 shows a diagram of the series elastic actuator 104. With reference to FIG. 3, although the control target was the rotational torque at the elbow joint 116, the proposed SEA design was constructed from a linear-type SEA with a linear spring rather than using a torsional spring. Linear SEA designs generally have more components and may be more bulky than rotary SEA designs; however, there are few compact, off-the-shelf, torsional springs that had enough stiffness for the target task. On the other hand, compact linear springs are more available, simpler in design, and have accurate linear stiffness with a wide range. In order to fit the transmission and SEA into the human arm-shaped frame, the inventors combined the linear SEA design with a slider-crank mechanism 120 and timing belt pulley 122.

The SEA of the depicted embodiment, as initially designed, generally included three parts: a spring cage 124, a coupler 126, and a crank 128. In the spring cage 123, two compression die springs 130 (e.g., part no. 9588K32, McMaster, USA) were installed and a custom slider block 132 was placed between them. Four linear bearings springs (e.g., part no. 61205K73, McMaster, USA) were placed inside the slider block 132 which traveled on four linear shafts (e.g., part no. 6112K37, McMaster, USA). Since a die compression spring can only support compression, two preloaded springs were connected in parallel to ensure that the spring assembly had bidirectional stiffness. The effective spring deflection was measured by a linear encoder with the resolution of 1.95 μμm (AS5311, ams, Austria) that was placed over the slider block 132.

The linear motion of the slider block 132 was converted to rotary motion at the elbow joint 116 through the slider-crank mechanism. The coupler 126 connected the slider block 132 via a pin joint 142 to the side wall of the timing belt pulley 122, operating as a crank. Since the crank resided on the timing belt pulley 122, the crank torque was transmitted from the electric motor through a timing belt drive and a bevel gear set.

For measurement, a 14-bit absolute rotary encoder (AS5048, ams, Austria) was installed to measure the elbow joint angle. Due to space constraints, the rotary encoder measured the angular position of the timing belt shaft instead of measuring the angular position of the elbow joint shaft directly, but other measurement methodologies are also contemplated. The torque of the electric motor was controlled to move the slider-crank mechanism to regulate spring deflection. By controlling the spring deflection, it was possible to control the joint torque at the elbow joint 116, which can be calculated from the following equation set, where $x_s$ is spring deflection, $k_s$ is spring constant, $l_c$ is crank length, and $\theta_c$ is angular position of the crank. Note that the magnitude of the resistive torque is independent of the actual joint angle since the timing belt pulley and slider-crank mechanism were not directly connected to the lower arm frame.

$$\begin{aligned} \tau &= F_s \times l_c \\ &= F_s l_c \cos\theta_c \\ &= k_s x_s l_c \cos(\sin^{-1}(x_s \backslash l_c)) \end{aligned}$$

Choosing the proper spring constant was a valuable point in the design of a SEA. By considering the target maximum torque at the elbow joint 116, a spring stiffness was determined for this particular embodiment. In order to generate the maximum 26 Nm of joint torque without having a permanent deformation of the spring, a die compression spring was needed with a 114.9 N/mm spring constant, and maximum load of 1165.5 N. Under a maximum allowed compression length of 9.4 mm (to accommodate the maximum load), the two die springs 130 were precompressed by 5 mm each. The maximum travel length of the slider 132 was limited to ±4 mm to avoid over compression and detachment of the springs from the slider block.

While any suitable construction (and method of construction) is contemplated, the simulator embodiment depicted in the figures was encased in a 3D printed shroud 160 (shown in FIG. 1) that resembled the contour of a human arm and provided a barrier between the user and the internal mechanism. Additional views are shown in FIGS. 4A-4B. This shroud 160 was printed from PLA. Design challenges when creating the shroud were focused on user safety, providing accessibility for internal adjustments, and shielding of the electronics, all while maintaining an anatomically accurate form. For user safety, a unique interlocking set of circular fingers were split between the upper and lower arm components, thereby allowing the user to place their hand along the posterior aspect of the elbow joint and be safely shielded from the belt mechanism inside. Accessibility was accomplished by allowing the anterior upper and lower cover pieces 164, 166 to be removed without the use of tools. The shroud pieces 164, 166 were split into two semicircles that were lined at either end with interlocking plastic tabs that were slightly deformed when pressed into each other.

Referring to FIG. 1, the hand component 110 and articulating wrist are were also 3D printed. To better simulate the 3D motion of the wrist, a spherical ball joint was incorporated into the hand model. To adjust freedom of movement of the wrist, the spherical ball joint could be constrained with threaded cap that secured the hand-wrist section to the forearm. The structural frame of the training simulator was fabricated from 6061 aluminum sheets (⅛" thick). Two sets of M5 screws were installed as mechanical stops at the elbow joint axis to physically limit the RoM of the forearm (FIG. 2 (b)). These mechanical stops provided a safety feature to protect the user and the device in the event of an unexpected malfunction that caused the simulator to rapidly flex or extend to the maximum limits.

Regarding the control system of the depicted embodiment, the elbow rigidity simulator 102 was actuated by an motor to replicate the various resistance torque levels caused by different UPDRS levels of rigidity behavior. The motor was controlled to track a reference torque commanded by the rigidity controller which generated the reference torque based on a proposed rigidity model. The controller was implemented on a microcontroller (e.g., TI F28379D, Texas Instrument, USA) and programmed using MATLAB/Simulink Embedded Coder (MATLAB 2020a, Mathworks, USA).

Figure 5:
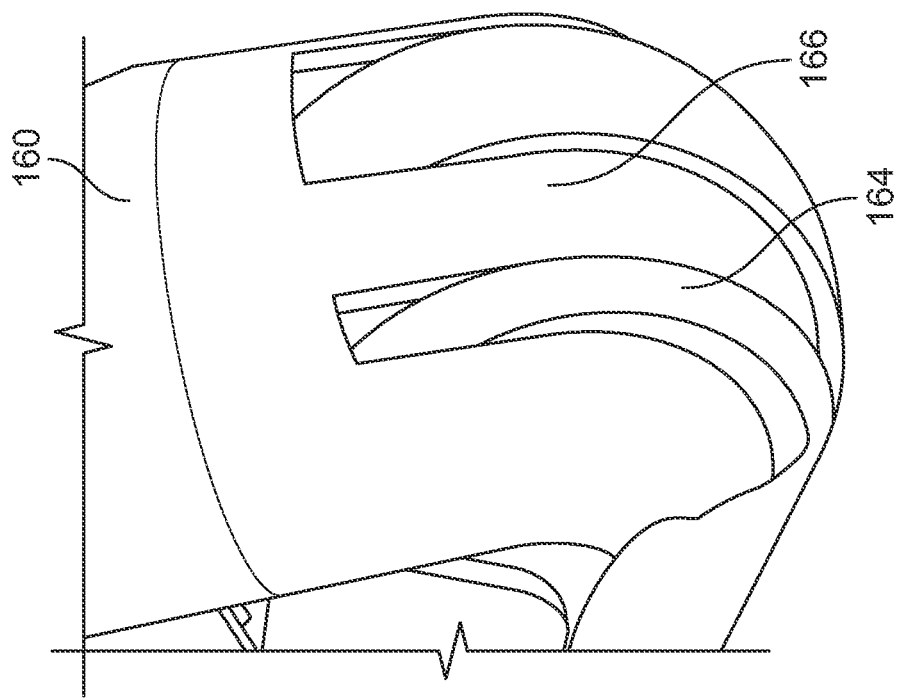
FIG. 5 is an image showing certain details of the elbow joint of the elbow lead-pipe rigidity simulator depicted in FIG. 1.
Figure 7:
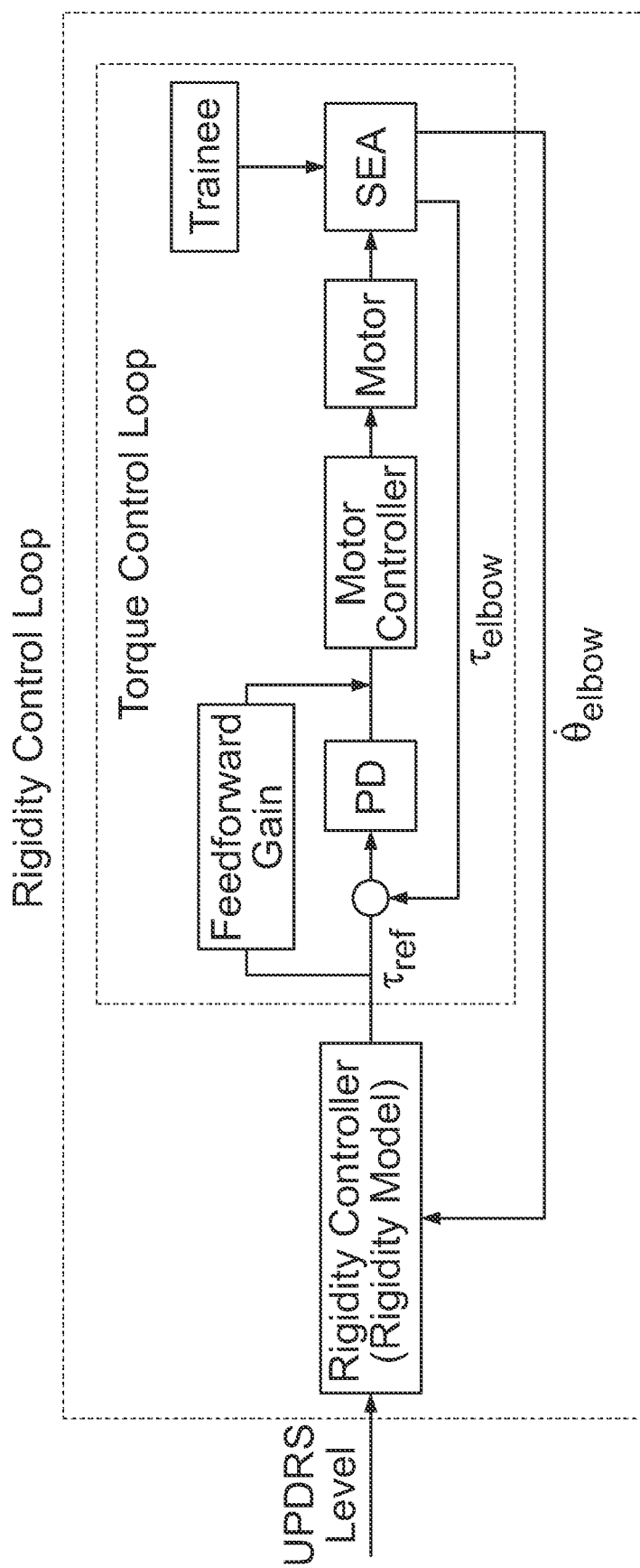
FIG. 7 is a control diagram for controlling the elbow lead-pipe rigidity simulator depicted in FIG. 1 in accordance with certain aspects of the present disclosure.

With reference to FIG. 7, the controller was composed of two parts: an inner torque control loop and an outer rigidity control loop, which all operated at 1 KHz (FIG. 5). In the torque control loop, the input current to the motor was regulated by a PD controller and a feedforward controller. The input current to the motor was modulated by a motor controller (C620, DJI, China), which controlled the torque of the motor through an embedded Field-Oriented Control.

The reference torque was generated by the outer rigidity loop. In the embodiment shown and described, a focus was directed at the generating resistance in the elbow joint during a passive stretch test caused by lead-pipe rigidity, which manifests as a constant resistance over the entire range of motion. The magnitude of the resistive torque is against movement direction (flexion or extension) and vary based on severity level (UPDRS level) (see Table 1 above). The reference torque should be 0 when there is no relative motion on the forearm. When the forearm is moved by an external force such as a user during a stretch test or gravitational force, the reference torque will be set to a certain value to exert resistance. For example, during a training session with a healthcare learner, the instructor would select the UPDRS level that the simulator would be replicating. This UPDRS level would correspond to a desired reference torque value, such as noted in Table 1. Similarly, if the user releases the simulator while the joint is slightly flexed, the forearm falls into an extended position by gravity, but the falling speed is reduced due to the resistance from the rigidity. Since there is a discontinuous change of reference torque from 0 (during no movement) to a discrete value (UPDRS level torque), this abrupt change will cause system instability in a physical embodiment. Therefore, the reference torque should be gradually, but quickly, adjusted from 0 to the constant target value. To address this issue, the inventors used a rigidity model that resembled the smooth Coulomb friction model proposed by. The rigidity resistance can be expressed by the following equation.

$$\tau_{ref} = -\tau_{avg,i} \tanh \frac{\dot{\theta}_{elbow}}{\omega_{tolerance}}$$

Figure 6:
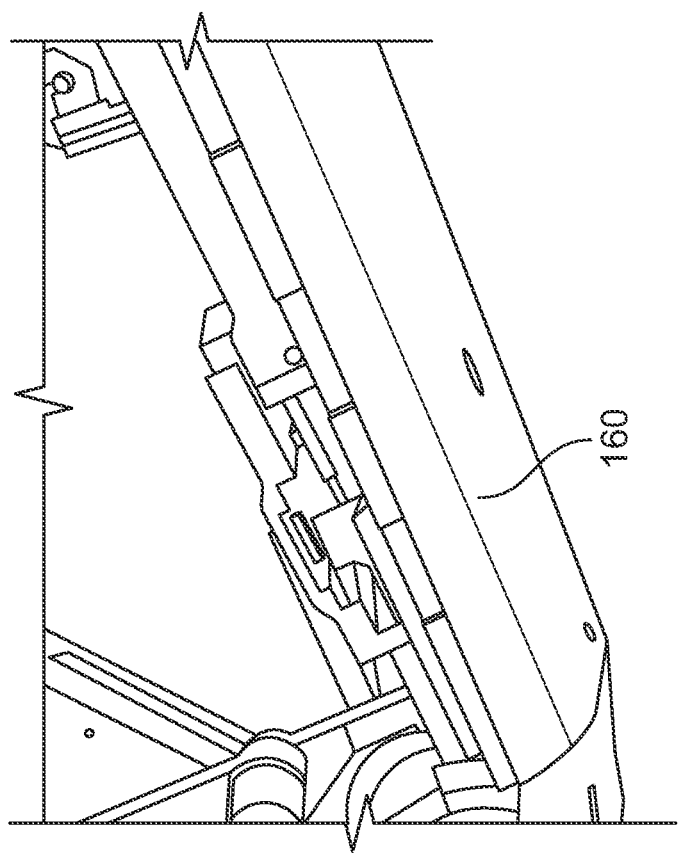
FIG. 6 is an image showing certain details of the elbow lead-pipe rigidity simulator depicted in FIG. 1, including placement of certain control components within a 3D-printed shroud in accordance with certain aspects of the present disclosure.

The reference torque $\tau_{ref}$ is expressed using a hyperbolic tangent function of $\dot{\theta}_{elbow}$, which is the real-time derivative of the measured elbow joint angle from the rotary encoder (FIG. 6). When an instructor sets a desired UPDRS level, the corresponding average torque from Table 1 (above) will be set to $\tau_{avg,i}$. When the forearm starts to move, the reference torque will increase from 0 until it is saturated at $\tau_{avg,i}$. By adjusting $\omega_{tolerance}$, the saturation speed threshold was tuned to ensure realistic replication of the rigidity behavior as well as maintain controller stability.

For assessing the depicted embodiment, a series of tests were performed to evaluate the torque estimation capability of the system. A detailed discussion of such testing and an analysis of the results is included in the following publication, which is authored by the inventors and is hereby incorporated by reference in its entirety: K. G. Gim et al., "Development of a Series Elastic Elbow Neurological Exam Training Simulator for Lead-pipe Rigidity," 2021 *IEEE International Conference on Robotics and Automation (ICRA)*, 2021, pp. 10340-10346, doi: 10.1109/ICRA48506.2021.9560891.

In summary, the elbow rigidity simulator 102 discussed above, and variations thereof, are advantageous for providing training opportunities for healthcare trainees who are learning to perform neurological examination techniques, a training simulator was developed. Such designs allow for mimicking of different severity levels of rigidity, and testing of real-world embodiments resulted and suggest good fidelity with matching expected resistive torque targets. The device provides the opportunity for clinicians to gain practical experience more efficiently that with present training techniques and has the potential to standardize diagnostic procedures and enhance rating accuracy and consistency in the future.

Embodiment 2: Ankle Clonus Training Simulator

An embodiment of an ankle clonus simulator 202 is shown in FIGS. 8-14. In the depicted example, haptic feedback force was generated from a series elastic actuator design, discussed in more detail below, which is advantageous for creating a particularly suitable training simulator with high-fidelity torque control while being cost-effective.

An objective when creating the present embodiment was to design a torque-controlled haptic device that rendered a realistic feeling of the muscle response of a patient with ankle clonus to trainees. Considering that an analytical torque-angle profile of ankle clonus is lacking from the literature, the simulated ankle clonus behavior was defined empirically. Specifically, the inventors quantified the ankle clonus assessment into (i) triggering factors, (ii) sustaining factors, and (iii) clonus simulation characteristic parameters (Table 2). This quantification of clonus was used to program the simulator's high-level controller, which calculated the simulated clonus muscle tone based on the user's input kinematics. The low-level torque controller was designed to accurately execute the torque command from the high-level controller. This device provided a safe and low-noise training environment for medical instruction.

TABLE 2

| | Original | Modified |
|---|---|---|
| Triggering factors * | | |
| Dorsiflexion speed threshold | >200°/s | >150°/s |
| Hand position panel engagement | Most touch plantar metatarsalhead, or both medial and lateral. | |
| Inversion/eversion angle range | >0° | NA |
| Sustaining factor | | |
| Sustaining torque threshold | >3 Nm | >2 Nm |
| Clonus Simulation Characteristics * | | |
| Frequency of ankle oscillation | 5 Hz | 6 Hz |
| Mean position of ankle oscillation | 10° PF | 0° |
| Peak-peak oscillation amplitude | 8° | 4° (decaying) |
| Duration | 6 s | 10 s |

* In our conversation dorsiflexion and inversion are negative. Zero angular position is defined at the neutral position (shank perpendicular to foot).

Figure 8:
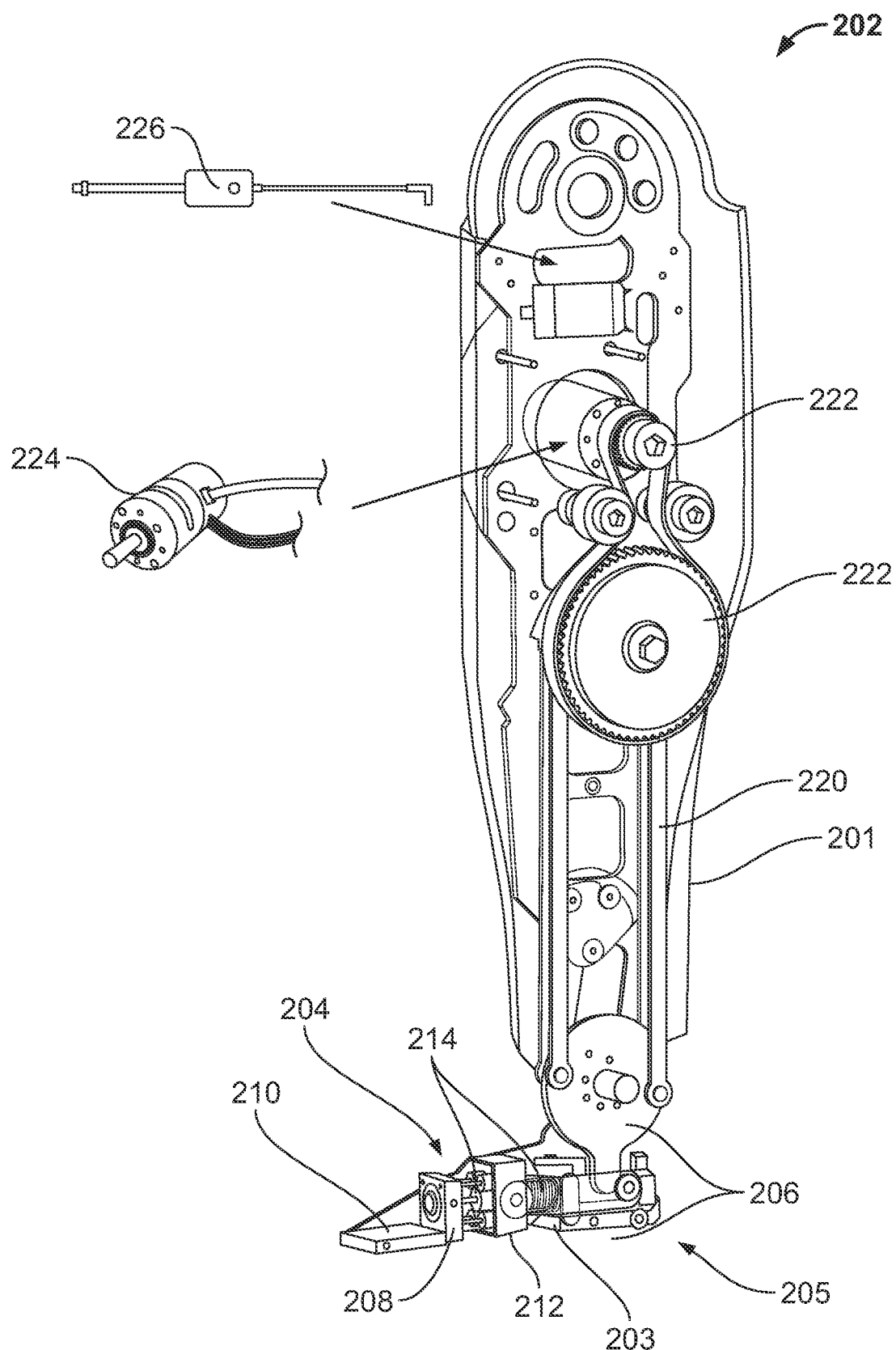
FIG. 8 is an image showing a second embodiment of a training simulator, and in particular an ankle clonus training simulator for simulating ankle clonus for training purposes. In particular.
Figure 9:
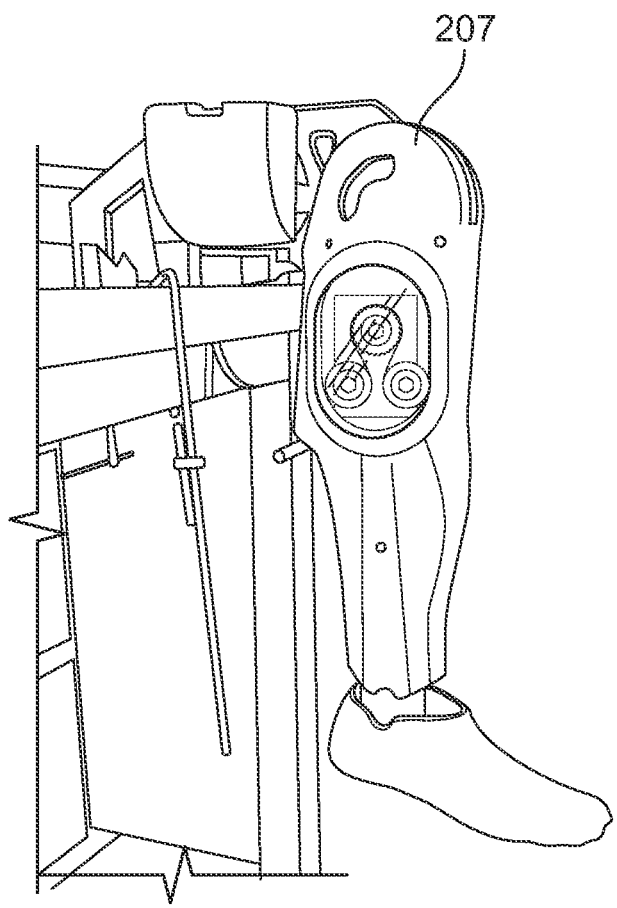
FIGS. 9-10 are images respectively showing the ankle clonus training simulator of FIG. 8 in bent and extended orientations, where movement between such positions occurs at a simulated knee in accordance with certain aspects of the resent disclosure.
Figure 10:
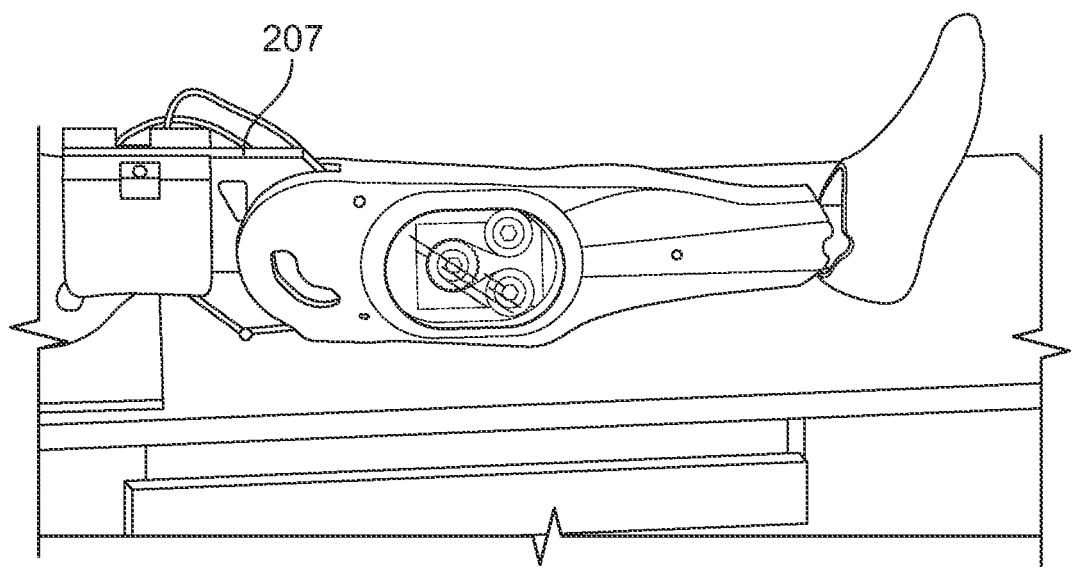

Referring to FIGS. 8-11, the ankle clonus simulator 202, has the appearance of a robotic lower leg. Its segment lengths (e.g., a leg component 201, a foot component 203, and an ankle joint 205 providing a connection) and 3D-printed shroud 230 (labeled in FIG. 11) were designed based on the anthropometric data of a 50th percentile Caucasian male, although other design parameters are also contemplated for the use in other embodiments. To improve device portability (total weight <7 kg) and reduce rotational inertia of the foot, most structural components were made of FR4 epoxy fiberglass for its high strength-to-weight ratio and the structural design was optimized via topology optimization for balanced stress distribution. The principal DOF was actuated (i.e., dorsiflexion-plantarflexion range of motion (DF/PF ROM): ±30°). The auxiliary DOF was passive (inversion-eversion (I/E ROM): ±10°), which was simulated by rotating the foot shroud relative to the underlying structural frame via a pair of inline spherical bearings in the fore and rear foot. The foot shroud geometry and dimensions were obtained from a 3D scanned prosthetic foot (US men's size 10) and the foot's inertial properties were matched with the real human foot. In the depicted embodiment (particularly shown by FIGS. 9-10, showing the knee bent vs. extended, respectively), the knee joint 207 can be adjusted and locked easily into a seated or supine position (two common clinical examination poses) with a dowel pin.

Notably, while not shown, the lower leg component may include a layer and/or other structure simulating an artificial tendon structure at the back of a shank shroud, similar to its biological counterpart. This tendon allows the trainees to tap on it to trigger the tendon reflex response. The tendon structure may also be capable of sensing the tap force applied by trainees so that this input signal would be sent to controller for generating the reflex response. Finally, the tendon structure may be configured such that it attenuates the exerted tap force, if trainees tap away from the sweet spot, and no reflex would be triggered. Tapping on the artificial tendon structure feels similar to a biological tendon.

Control and actuation is provided by a series elastic actuator 204 associated components, with certain key control and actuation components shown in FIG. 8. The series elastic actuation strategy was chosen for its safe human-robot interaction, accurate force control, robustness, and relatively low cost. Referring to FIG. 8, the actuation torque was exerted via a crank-slider mechanism 2026 based on a spring cage 208 mounted in the foot frame 210. A slider 212 in the middle of the spring cage 208, and in the middle of two linear springs 214 rode on four miniature linear rails with ball bearings for ease of movement. To ensure resistance during both dorsi- and plantarflexion, the slider 210 was preloaded by a die spring (e.g., part no. 1804N193, McMaster, USA) on each side of the slider 212, which resulted in a total series spring stiffness of ~165 N/mm. The simulator's drivetrain was actuated by a 150 W brushless DC motor 224 with an integrated two-stage planetary gearbox (~19:1) (M3508, DJI, China), followed by a single-stage 3.2:1 timing belt drive 222 (MR5, Misumi, Japan) and a 1:1 linkage drive 220. The belt drive was advantageous in quiet and multi-turn operation but if spanning over long distance, its intrinsic compliance will drop to the similar magnitude of the series springs and influence the effective system stiffness. Therefore, a custom linkage drive 220 consisting of four thin fiberglass bars was combined with the belt drive to transmit actuation torque to the distal ankle joint, keeping the belt span distance minimal. As a result, this drivetrain could generate a peak ankle torque of 17 Nm, with an effective stiffness of ~5020 N/mm (an order of magnitude larger than the series spring stiffness, thus regarded as rigid).

A dynamic model of the simulator's control system was developed to guide choice of series spring stiffness to achieve a torque control bandwidth that was sufficiently high to replicate clonus behavior (see equation below). The crank-slider mechanism 204 in the present embodiment had nonlinear kinematics. However, given the crank rotation angle would be within only ±2° during operation, the equation of motion was safely linearized around an equilibrium point of crank angle at 0°. In addition, considering that the reflected motor inertia dominated the system's inertia, the model assumed the output end (i.e., simulator's foot) to be fixed on the ground and only the DOF of motor-driven slider movement in the spring cage was modeled to investigate system's natural frequency. Thus, with these two simplifications, the system dynamics were reduced to a 1-DOF linear oscillator (see equation below). For a SEA, the large torque control bandwidth is limited by the open-loop system bandwidth, approximated by the system's fundamental natural frequency. Using the equation below this paragraph, the spring stiffness was selected such that the system had a fundamental natural frequency at ~16 Hz, allowing a torque control bandwidth up to ~2 times of the maximum clonus motion frequency). This safety factor in control bandwidth was designed to account for any unmodeled dynamics (e.g., bearing friction, spring intrinsic damping, belt compliance) that might slow down the system.

$$0.0041\ddot{\theta}_m + 0.079\dot{\theta}_m + 41\theta_m = \tau_m$$

Figure 11:
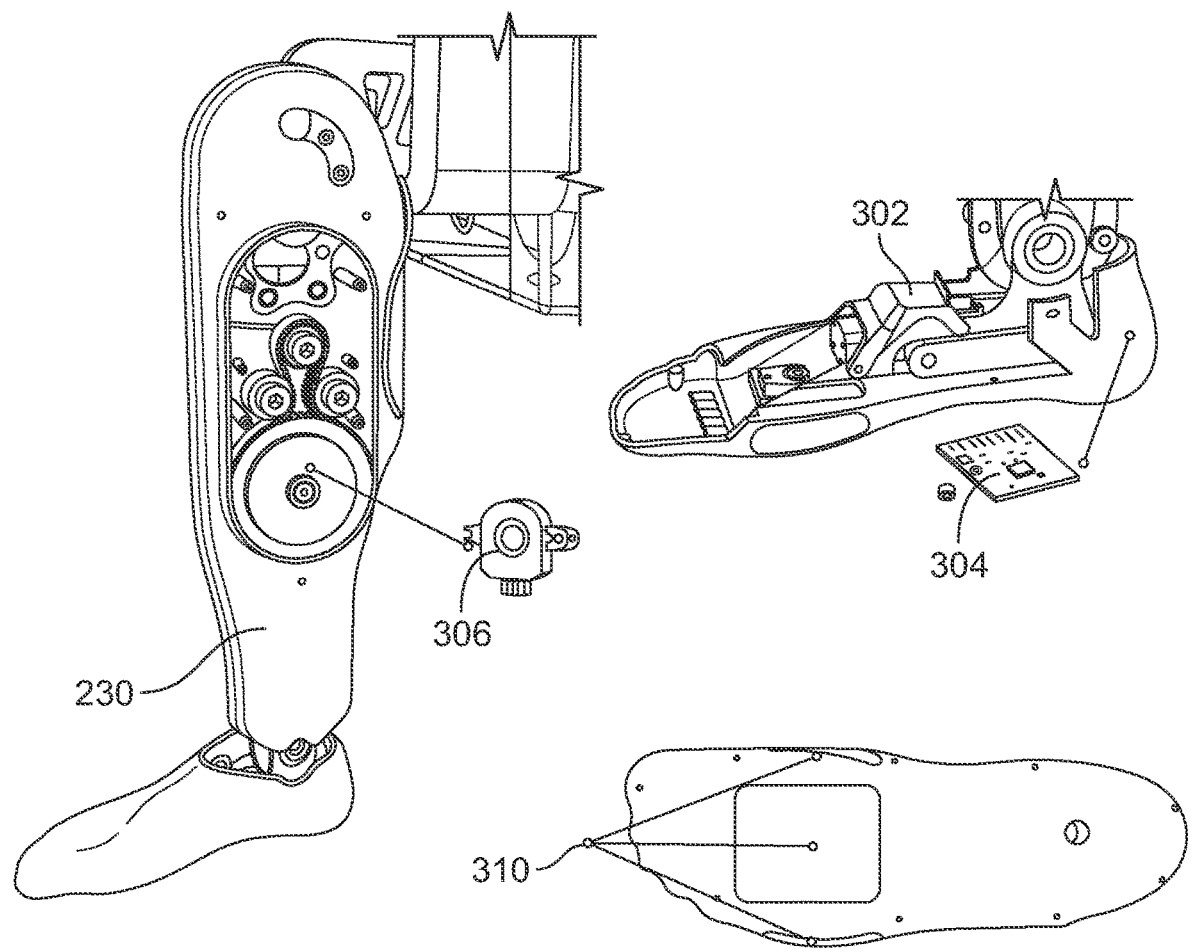
FIG. 11 is an image showing certain electronic sensor components and other detection-related features for the ankle clonus training simulator of FIG. 8 in accordance with certain aspects of the present disclosure.
Figure 12:
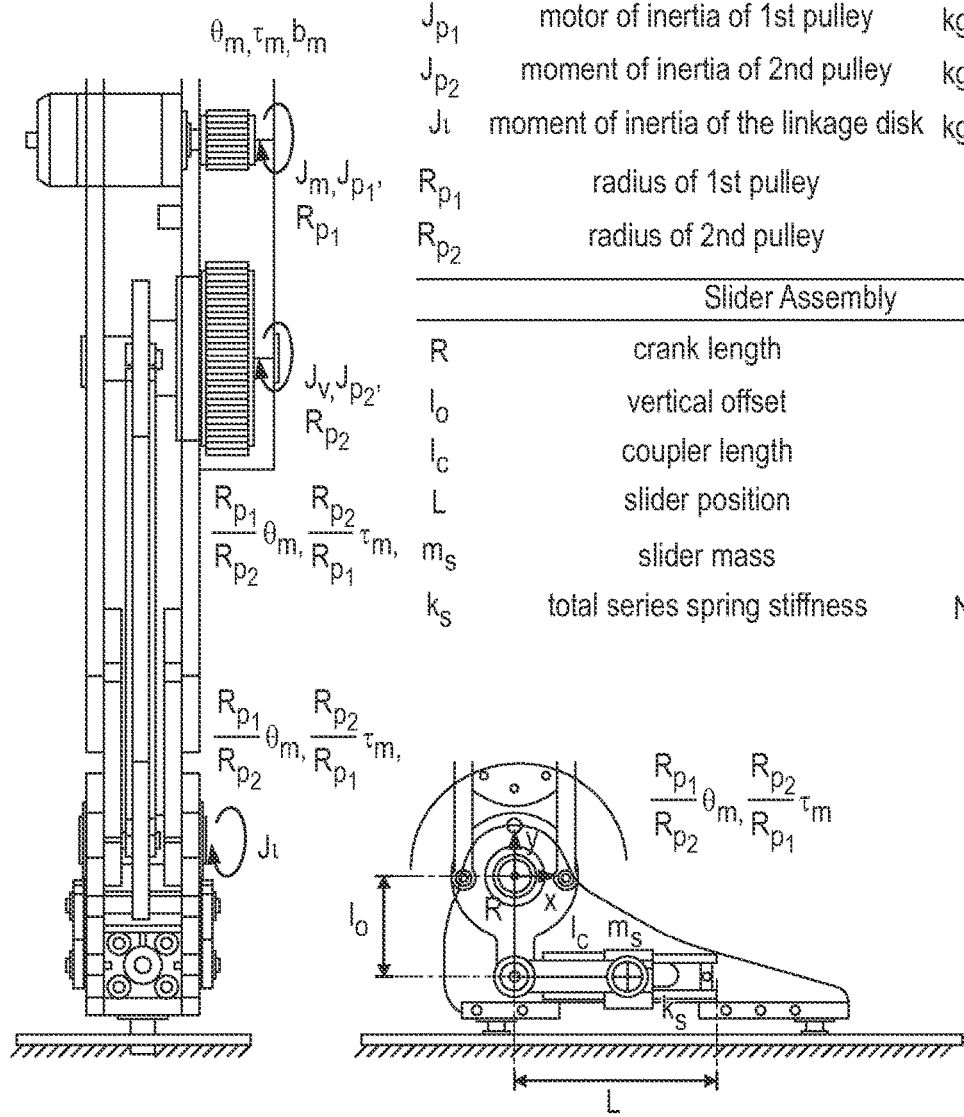
FIG. 12 is a set of diagrams, along with a reference table, showing certain mathematical equations characterizing certain physical properties of the ankle clonus training simulator of FIG. 8.

Furthermore, as illustrated by FIG. 11, the present embodiment allows for an array of onboard sensing capabilities for monitoring the trainee's performance and the providing of real-time feedback. Specifically, a linear encoder 302 (AS5311, ams AG, Austria) mounted on the spring cage was included to measure spring deflection allowed calculation of the interaction force between the trainee and simulator, as part of the SEA strategy (without the need for expensive load cells). Two DOFs (DF/PF and I/E) of the simulator were sensed by two absolute rotary encoders 304 (AMT22, CUI, USA; and AS5048, ams AG, Austria, respectively). These readings were used in the control logic to define whether the clonus would be triggered based on the trainee's input motion (Table I). Eight force-sensitive resistors 310 (FSRs) (Model 400 and Model 402, Interlink Electronics, USA) (only three areas depicted in FIG. 11) were integrated into the foot shroud around the metatarsal heads (plantar, medial and lateral aspects) as simple touch sensors to detect whether the trainee's hand was properly positioned on the forefoot (Table I). With proper visualization means (e.g., a tablet or screen), data from this sensor array could also provide real-time performance feedback to the trainees for technique correction without the presence of an instructor. FIG. 12 depicts relevant mathematical formulas relevant for control, feedback, and other information related to design and function of the device.

Figure 13:
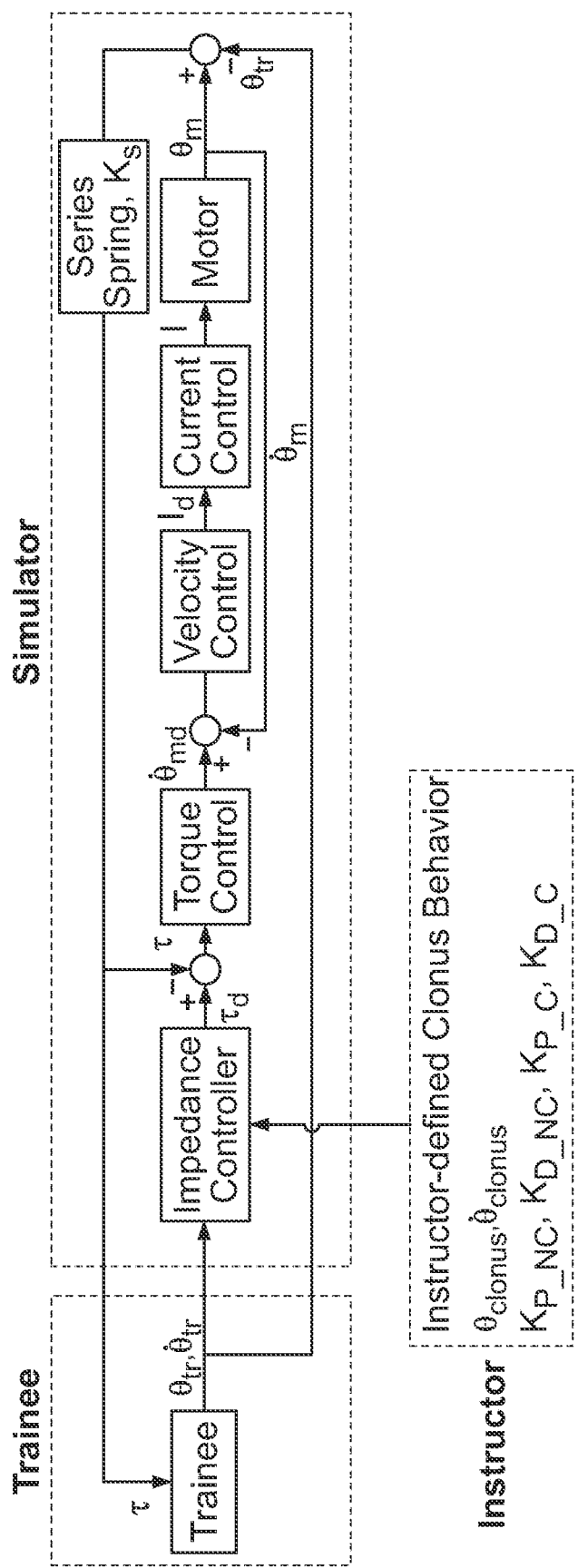
FIG. 13 is a control diagram depicting controller operation for the ankle clonus training simulator of FIG. 8 in accordance with certain aspects of the present disclosure.

FIG. 13 shows an example of a control system design, where the depicted example was used for controlling the depicted ankle clonus simulator 202. The low-level controller had a cascaded architecture (from innermost to outermost: current, velocity, and torque controls) and all loops updated at 1 kHz. The innermost control loop provided proportional-integral (PI) current feedback control and was regulated and executed by a motor controller 226 (C620, DJI, China) with a pre-programmed current loop bandwidth of ~500 Hz. Motor inertia compensation and current command were also implemented as feedforward current inputs. The middle PI velocity loop was added to provide a tight feedback loop around the motor to address backlash in the integrated gearbox. The velocity loop was tuned to achieve a bandwidth of ~50 Hz, roughly 5 times faster than the desired outer torque loop (~10 Hz) to guarantee the separation between servo control loops. Eventually, a proportional-derivative (PD) torque controller (essentially a position controller that modulated the spring deflection, given the SEA architecture) was implemented in the outermost loop that received torque output commands from the high-level controller.

The high-level controller was in the form of an impedance controller that produced a desired torque command ($\tau d$) and switched between clonus (first equation below) and non-clonus (second equation below) modes by evaluating if all clonus triggering criteria were satisfied (Table 2). Each mode was programmed via a desired reference motion trajectory and a set of impedance parameters. The estimated torque ($\tau$) was calculated using the known series spring stiffness, crank position (using small-angle approximation), and spring deflection ($\Delta L$) directly measured by the linear encoder (bottom/third equation below). In the equation set below, $\theta_{clonus}$ and $\dot{\theta}_{clonus}$ are reference clonus oscillation ankle angle and angular velocity, while $\theta tr$ and $v$ $\dot{\theta}_{tr}$ are trainee's input kinematics derived from the DF/PF rotary encoder 306 (FIG. 11). In clonus mode, the controller generated a sinusoidal reference angle trajectory with parameters defined in Table I, and the reference velocity was obtained by numerically differentiating the angle trajectory. In the non-clonus mode, the reference angle and angular velocity are 0, meaning that the equilibrium point was at neutral position and zero velocity.

$$\tau_d = K_{P\_C}(\theta_{clonus} - \theta_{tr}) + K_{D\_C}(\dot{\theta}_{clonus} - \dot{\theta}_{tr})$$
$$\tau_d = -K_{P\_NC}\theta_{tr} - K_{D\_NC}\dot{\theta}_{tr}$$
$$\tau = k_s R^2 \left(\frac{R_{P_1}}{R_{P_2}}\theta_m - \theta_{tr}\right) = k_s R \Delta L$$

The impedance controller was chosen to control the ankle motion in the non-clonus mode, i.e., mimicking simplified ankle joint dynamics parametrized by linear stiffness (KP_NC) and damping (KD_NC). The use of an impedance controller also extended to the clonus mode by defining an intensified interaction (due to hyperactive stretch reflex) between rhythmic clonus ankle motion and the trainee's input effort. The KP_C (1 Nm/°) and KD_C (0.03 Nm/(°/s)) were the set of virtual stiffness and damping for the clonus mode; similarly, KP_NC (0.15 Nm/°) and KD_NC (0.01 Nm/(°/s)) for the non-clonus mode. These two sets of impedance parameters were obtained from with slight increase in the damping ratio to improve stability.

All sensors readings were accessed and packed by a lower-level microcontroller (Teeny 3.5, PJRC, USA) and then transmitted to the upper-level microcontroller (TI C2000, TMS28379D, Texas Instrument, USA) at 1.5 kHz. The control system was implemented on the upper-level microcontroller and programmed using Simulink Embedded Coder (MATLAB 2019b, MathWorks, USA).

Figure 14:
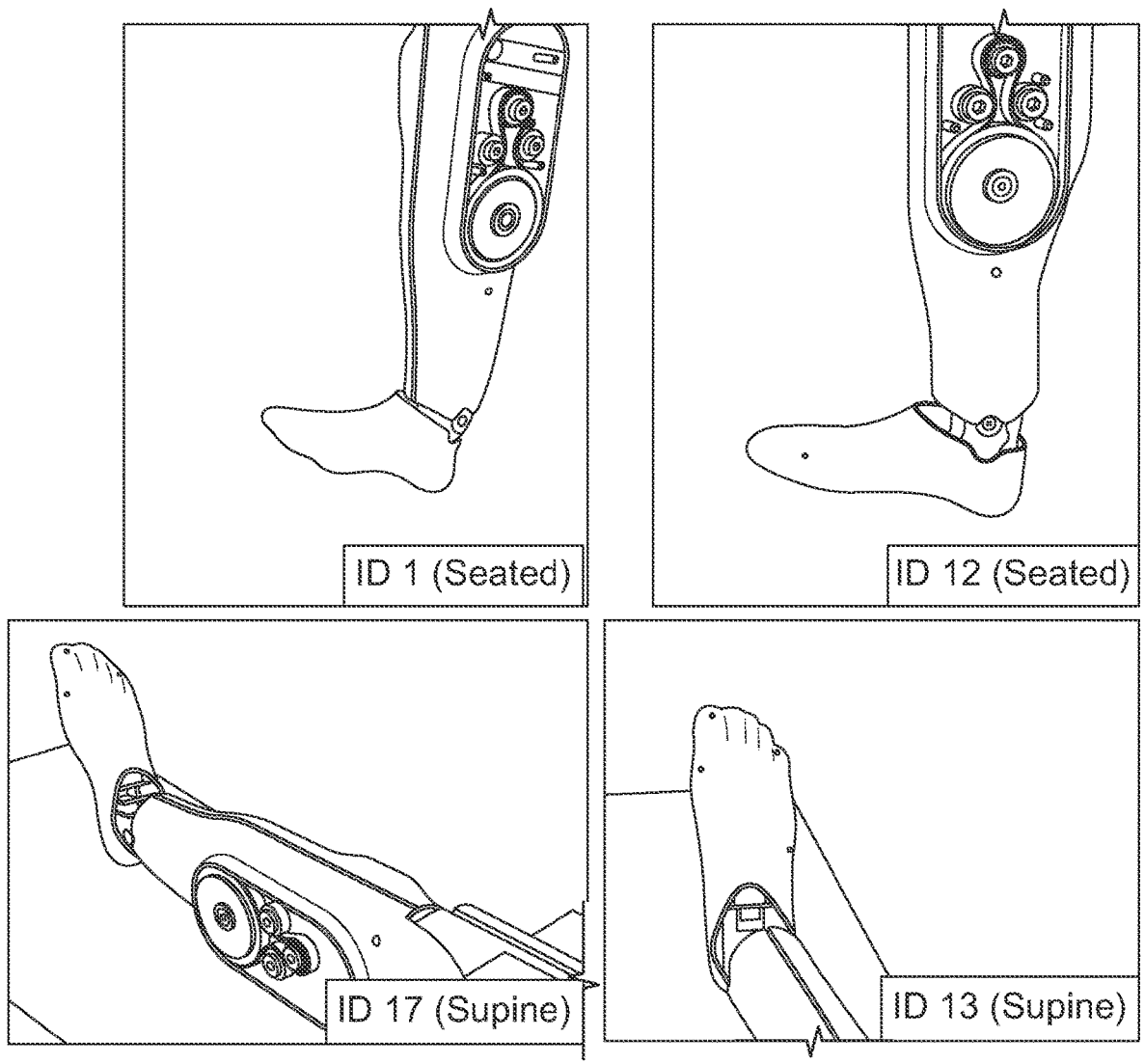
FIG. 14 is a set of images depicting a training session utilizing the ankle clonus training simulator of FIG. 8 in accordance with certain aspects of the present disclosure.

A series of benchtop experiments were conducted to evaluate the torque estimation capability of our SEA system, as well as the performance of the low- and high-level controllers. As shown in FIG. 14, for example, such experiments involved a clinician testing the simulator for perceived ankle clonus via a variety of motions of hte ankle depicted in ID1, ID12, ID13, and ID17 shown in FIG. 14, among other positions, during system operation. A detailed discussion of such benchtop experiments, and a discussion of the results, is included in the following publication, which was authored by the inventors and is incorporated herein by reference in its entirety: Y. Pei, T. Han, C. M. Zallek, T. Liu, L. Yang and E. T. Hsiao-Wecksler, "Design and Clinical Validation of a Robotic Ankle-Foot Simulator With Series Elastic Actuator for Ankle Clonus Assessment Training," in IEEE Robotics and Automation Letters, vol. 6, no. 2, pp. 3793-3800, April 2021, doi: 10.1109/LRA.2021.3065242. Additionally, a set of follow-up evaluations (and adjusted control parameters) are discussed in the following publication, which was authored by the inventors and is incorporated herein by reference in its entirety: Pei, Y, Zallek, C M, & Hsiao-Wecksler, E T. "Control Design and Preliminary Evaluation of a Medical Education Simulator for Ankle Tendon Reflex Assessment Training." Proceedings of the 2022 Design of Medical Devices Conference. 2022 Design of Medical Devices Conference. Minneapolis, MN, USA. Apr. 11-14, 2022. V001T06A007. ASME.

In summary, the present embodiment proved advantageous for at least the following reasons: it is capable of (1) generating a simulated clonus behavior whose triggering and maintaining mechanism aligned with clinicians' experience, and (2) recreating a relatively realistic haptic response of affected muscles. The use of a SEA system resulted in not only a high-performance research simulator, but also a cost-effective and compact design that could become viable to be widely deployed as a valuable training tool for learners.

Having described various aspects of the subject matter above, additional disclosure is provided below that may be consistent with the claims originally filed with this disclosure.

One general aspect includes a training simulator for healthcare provider training, an upper arm component representing an upper arm of a human. The training simulator also includes a forearm component representing a forearm of the human. The simulator also includes an elbow joint representing an elbow of the human. The simulator also includes and an actuator system may include: a linear slider-crank mechanism and an actuator for controlling the linear slider-crank mechanism, where the linear slider-crank mechanism is controlled to simulate at least one of a lead-pipe rigidity, cogwheel rigidity, and spasticity behavior between the upper arm component and the forearm component at the elbow joint, and where adjustment of the linear slider-crank mechanism with the actuator controls the torque at the elbow joint.

Implementations may include one or more of the following features. The training simulator where the actuator may include a motor that is electrically connected to a controller, and where the controller operates the motor such that the muscle tone at the elbow tracks a reference torque profile based on a predetermined model. The predetermined model is configured to simulate at least one of the lead-pipe rigidity, cogwheel rigidity, and spasticity. The linear slider-crank mechanism includes a crank located at the elbow joint, a linear slider located at the forearm component, and a coupler link extending from the crank to the linear slider such that rotation of the crank causes linear movement of the linear slider. The linear slider contacts at least one spring, and where movement of the linear slider causes displacement of the at least one spring, where adjusting a spring force acting on the linear slider. A spring cage houses the linear slider and the at least one spring, and where outer walls of the spring cage are fixed relative to the forearm component. Rotational movement of the upper arm component relative to the forearm component causes linear movement of the linear slider within the spring cage in a manner counteracting the spring force. The linear slider is located between a first compression spring and a second compression spring, and where the first compression spring and the second compression spring are constrained by the outer walls of the spring cage. A crank of the linear slider-crank mechanism is moveable via a timing belt, and where rotation of the timing belt is controlled by the actuator. The crank includes a pully moveable via the timing belt.

Another general aspect includes a training simulator for healthcare provider training, a leg component representing a lower leg of a human. The training simulator also includes a foot component representing a foot of the human. The simulator also includes an ankle joint representing an ankle of the human. The simulator also includes and an actuator system may include: a linear slider-crank mechanism and an actuator for controlling the linear slider-crank mechanism, where the linear slider-crank mechanism is configured to control a torque required to move the foot component relative to the leg component at the ankle joint, and where adjustment of the linear slider-crank mechanism with the actuator controls the torque at the ankle joint.

Implementations may include one or more of the following features. The training simulator where the actuator may include a motor that is electrically connected to a controller, and where the controller operates the motor such that the torque at the ankle tracks a reference torque based on at least one of a predetermined ankle clonus and ankle tendon reflex model. The controller includes an impedance controller. The linear slider-crank mechanism includes a crank located at the ankle joint, a linear slider located at the foot component, and a coupler link extending from the crank to the linear slider such that rotation of the crank causes linear movement of the linear slider. The linear slider contacts at least one spring, and where movement of the linear slider causes displacement of the at least one spring, where adjusting a spring force acting on the linear slider. A spring cage houses the linear slider and the at least one spring, and where outer walls of the spring cage are fixed relative to the foot component. Rotational movement of the foot component relative to the leg component causes linear movement of the linear slider within the spring cage in a manner counteracting the spring force. The training simulator may include a linear encoder for monitoring a spring deflection within the spring cage and configured to send a corresponding signal to a controller. The linear slider is located between a first compression spring and a second compression spring, and where the first compression spring and the second compression spring are constrained by the outer walls of the spring cage. A crank of the linear slider-crank mechanism is moveable via a timing belt, and where rotation of the timing belt is controlled by the actuator. The crank includes a pully moveable via the timing belt.

Another general aspect includes a training simulator for healthcare provider training, a first body component. The training simulator also includes a second body component. The simulator also includes a joint located at a junction of the first body component and the second body component, where the first body component is rotatable relative to the second body component at the joint. The simulator also includes and an actuator system may include: a linear slider-crank mechanism and an actuator for controlling the linear slider-crank mechanism, where the linear slider-crank mechanism is configured to control a torque required to move the first body component relative to the second body component at the joint, and where control of the linear slider-crank mechanism with the actuator adjusts the torque.

Implementations may include one or more of the following features. The training simulator where the actuator may include a motor that is electrically connected to a controller, and where the controller operates the motor such that the torque tracks a predetermined model when the first body component is moved relative to the second body component by a user. The linear slider-crank mechanism includes a crank located at the joint, a linear slider at the second body component, and a coupler link extending from the crank to the linear slider such that rotation of the crank causes linear movement of the linear slider. The linear slider contacts at least one spring, and where movement of the linear slider causes displacement of the at least one spring, where adjusting a spring force acting on the linear slider. A spring cage houses the linear slider and the at least one spring, and where outer walls of the spring cage are fixed relative to the second body component. Rotational movement of the first body component relative to the second body component causes linear movement of the linear slider within the spring cage in a manner counteracting the spring force. The linear slider is located between a first compression spring and a second compression spring, and where the first compression spring and the second compression spring are constrained by the outer walls of the spring cage. A crank of the linear slider-crank mechanism is moveable via a timing belt, and where rotation of the timing belt is controlled by the actuator. The crank includes a pully moveable via the timing belt.

While various embodiments have been described, it will be apparent to those of ordinary skill in the art that many more embodiments and implementations are possible. Accordingly, the embodiments described herein are examples, and not the only possible embodiments and implementations within the scope of this description.

We claim:

1. A training simulator for healthcare provider training, the training simulator comprising:
a first body component;
a second body component;

a joint located at a junction of the first body component and the second body component, wherein the first body component is rotatable relative to the second body component at the joint; and an actuator system comprising:

a linear slider-crank mechanism and an actuator for controlling the linear slider-crank mechanism, wherein the linear slider-crank mechanism is configured to control a torque required to move the first body component relative to the second body component at the joint, and wherein control of the linear slider-crank mechanism with the actuator adjusts the torque.

2. The training simulator of claim 1, wherein the actuator comprises a motor that is electrically connected to a controller, and wherein the controller operates the motor such that the torque tracks a predetermined model when the first body component is moved relative to the second body component by a user.

3. The training simulator of claim 1, wherein the linear slider-crank mechanism includes a crank located at the joint, a linear slider at the second body component, and a coupler link extending from the crank to the linear slider such that rotation of the crank causes linear movement of the linear slider.

4. The training simulator of claim 3, wherein the linear slider contacts at least one spring, and wherein movement of the linear slider causes displacement of the at least one spring, whereby adjusting a spring force acting on the linear slider.

5. The training simulator of claim 4, wherein a spring cage houses the linear slider and the at least one spring, and wherein outer walls of the spring cage are fixed relative to the second body component.

6. The training simulator of claim 5, wherein rotational movement of the first body component relative to the second body component causes linear movement of the linear slider within the spring cage in a manner counteracting the spring force.

7. The training simulator of claim 5, wherein the linear slider is located between a first compression spring and a second compression spring, and wherein the first compression spring and the second compression spring are constrained by the outer walls of the spring cage.

8. A training simulator for healthcare provider training, the training simulator comprising:

an upper arm component representing an upper arm of a human;

a forearm component representing a forearm of the human;

an elbow joint representing an elbow of the human; and an actuator system comprising:

a linear slider-crank mechanism and an actuator for controlling the linear slider-crank mechanism, wherein the linear slider-crank mechanism is controlled to simulate at least one of a lead-pipe rigidity, cogwheel rigidity, and spasticity behavior between the upper arm component and the forearm component at the elbow joint, and wherein adjustment of the linear slider-crank mechanism with the actuator controls the torque at the elbow joint.

9. The training simulator of claim 8, wherein the actuator comprises a motor that is electrically connected to a controller, and wherein the controller operates the motor such that the muscle tone at the elbow tracks a reference torque profile based on a predetermined model.

10. The training simulator of claim 9, wherein the predetermined model is configured to simulate at least one of the lead-pipe rigidity, cogwheel rigidity, and spasticity.

11. The training simulator of claim 8, wherein the linear slider-crank mechanism includes a crank located at the elbow joint, a linear slider located at the forearm component, and a coupler link extending from the crank to the linear slider such that rotation of the crank causes linear movement of the linear slider.

12. The training simulator of claim 8, wherein a crank of the linear slider-crank mechanism is moveable via a timing belt, and wherein rotation of the timing belt is controlled by the actuator.

13. The training simulator of claim 12, wherein the crank includes a pully moveable via the timing belt.

14. A training simulator for healthcare provider training, the training simulator comprising:

a leg component representing a lower leg of a human;

a foot component representing a foot of the human;

an ankle joint representing an ankle of the human; and an actuator system comprising:

a linear slider-crank mechanism and an actuator for controlling the linear slider-crank mechanism, wherein the linear slider-crank mechanism is configured to control a torque required to move the foot component relative to the leg component at the ankle joint, and wherein adjustment of the linear slider-crank mechanism with the actuator controls the torque at the ankle joint.

15. The training simulator of claim 14, wherein the actuator comprises a motor that is electrically connected to a controller, and wherein the controller operates the motor such that the torque at the ankle tracks a reference torque based on at least one of a predetermined ankle clonus and ankle tendon reflex model.

16. The training simulator of claim 15, wherein the controller includes an impedance controller.

17. The training simulator of claim 14, wherein the linear slider-crank mechanism includes a crank located at the ankle joint, a linear slider located at the foot component, and a coupler link extending from the crank to the linear slider such that rotation of the crank causes linear movement of the linear slider.

18. The training simulator of claim 17, wherein the linear slider contacts at least one spring, and wherein movement of the linear slider causes displacement of the at least one spring, whereby adjusting a spring force acting on the linear slider.

19. The training simulator of claim 18, wherein a spring cage houses the linear slider and the at least one spring, and wherein outer walls of the spring cage are fixed relative to the foot component.

20. The training simulator of claim 18, wherein a crank of the linear slider-crank mechanism is moveable via a timing belt, and wherein rotation of the timing belt is controlled by the actuator, and wherein the crank includes a pully moveable via the timing belt.

* * * * *